(12) United States Patent
Luby et al.

(10) Patent No.: US 12,311,793 B2
(45) Date of Patent: May 27, 2025

(54) ROAD CONSTRUCTION MACHINES FOR AN ELECTRIC ROAD CONSTRUCTION SITE

(71) Applicant: Volvo Truck Corporation, Gothenburg (SE)

(72) Inventors: Martyn Luby, Torshälla (SE); Lena Larsson, Västra Frölunda (SE)

(73) Assignee: Volvo Truck Corporation, Gothenburg (SE)

(*) Notice: Subject to any disclaimer, the term of this patent is extended or adjusted under 35 U.S.C. 154(b) by 598 days.

(21) Appl. No.: 17/746,327

(22) Filed: May 17, 2022

(65) Prior Publication Data
US 2022/0379756 A1 Dec. 1, 2022

(30) Foreign Application Priority Data
May 31, 2021 (EP) .................................... 21176963

(51) Int. Cl.
*B60L 53/30* (2019.01)
*B60L 1/00* (2006.01)
(Continued)

(52) U.S. Cl.
CPC ................. *B60L 53/32* (2019.02); *B60L 1/00* (2013.01); *B60L 53/16* (2019.02); *E01C 19/23* (2013.01); *B60L 2200/40* (2013.01)

(58) Field of Classification Search
CPC .................................. B60L 53/32; B60L 53/16
(Continued)

(56) References Cited

U.S. PATENT DOCUMENTS

2018/0345952 A1 12/2018 Layfield et al.
2019/0135133 A1* 5/2019 Miller .................... B60L 53/34
(Continued)

FOREIGN PATENT DOCUMENTS

DE 102013104211 A1 10/2014
JP 2010142050 A 6/2010
(Continued)

OTHER PUBLICATIONS

Extended European Search Report for European Patent Application No. 21176963.3, mailed Nov. 24, 2021, 8 pages.

*Primary Examiner* — Nathaniel R Pelton
(74) *Attorney, Agent, or Firm* — Withrow & Terranova, PLLC (57) ABSTRACT

A road construction system comprising an at least partly electrically powered road construction machine and one or more service vehicles arranged to supply or remove road construction material to or from the electric road construction machine at a road construction work site, wherein each service vehicle comprises an electrical storage system (ESS) and an electrical connector arranged to interface with an electric system of the road construction machine, wherein the road construction machine is arranged to dock with the service vehicle in a mated configuration to receive and/or off-load the road construction material and to receive electrical energy via the electrical connector, and wherein the road construction machine is arranged to be at least partly powered from the service vehicle ESS when in the mated configuration.

20 Claims, 5 Drawing Sheets

(51) Int. Cl.
   *B60L 53/16*      (2019.01)
   *E01C 19/23*      (2006.01)
(58) Field of Classification Search
   USPC .......................................................... 320/109
   See application file for complete search history.

(56)               References Cited

U.S. PATENT DOCUMENTS

2020/0175551  A1*   6/2020   Penilla .................... B60L 53/80
2021/0008997  A1*   1/2021   Marsolek ................ B60L 53/31

FOREIGN PATENT DOCUMENTS

WO          2019222607  A1    11/2019
WO      WO 2019/222607     *  11/2019
WO          2020200509  A1    10/2020

* cited by examiner

ROAD CONSTRUCTION MACHINES FOR AN ELECTRIC ROAD CONSTRUCTION SITE

RELATED APPLICATIONS

The present application claims priority to European Patent Application No. 21176963.3, filed on May 31, 2021, and entitled "ROAD CONSTRUCTION MACHINES FOR AN ELECTRIC ROAD CONSTRUCTION SITE," which is incorporated herein by reference in its entirety.

FIELD OF THE DISCLOSURE

The present disclosure relates primarily to service vehicles for road construction sites, i.e., heavy-duty vehicles such as hauler trucks, tipper trucks and push-off trucks for transporting road construction material to and from the work site. The disclosure also relates to road construction machines, such as electrically powered pavers, road milling machines and compactors arranged to dock with a service vehicle.

BACKGROUND

Electrically powered construction equipment, such as electric excavators and wheel loaders are being developed. These vehicles may be charged over-night at special on-site charging stations at the construction site where they are being used. Quick-charge systems arranged for transferring electrical energy at high power may be used to reduce the time spent charging the equipment. However, some construction sites lack mains power for charging electric vehicles, at least for charging at high power. One example is a sub-urban road construction site where availability of high capacity mains electricity may be limited.

Road construction equipment often require relatively large amounts of energy to operate. For instance, to operate an asphalt paver for an entire workday may require a battery capacity on the order of 500 kWh. This relatively large battery capacity drives cost and is therefore undesirable. Also, large batteries add weight to the equipment, making the machinery more difficult to transport and handle in general.

There is a desire to provide more cost-efficient electric road construction equipment.

SUMMARY

It is an object of the present disclosure to provide more cost-efficient electric road construction equipment which may operate efficiently also without a high-power electrical mains connection at the work site. This object is achieved by a road construction system comprising an at least partly electrically powered road construction machine and one or more service vehicles arranged to transport road construction material to or from the electric road construction machine at a road construction work site. Each service vehicle comprises an electrical storage system (ESS) and an electrical connector arranged to interface with an electric system of the road construction machine, where the road construction machine is arranged to dock with the service vehicle in a mated configuration to receive and/or off-load the road construction material and to at the same time receive electrical energy via the electrical connector, wherein the road construction machine is arranged to be at least partly powered from the service vehicle ESS when in the mated configuration. The service vehicle has dual purposes in the proposed system: it transports road construction material and at the same time transports electrical energy to the work site. The road construction machine may be any of a paver, a road milling machine, and/or a compactor. In case the road construction machine is a paver, the service vehicle is a supply vehicle which supplies both road construction materials such as asphalt and electrical energy to the work site.

The electrical systems of the road construction vehicles comprised in the proposed system may be dimensioned to only provide electrical energy during time periods when the road construction machine is not docked to a service vehicle. This is an advantage since the capacity of the ESS on the road construction machine can be reduced, leading to a more cost-efficient design. Also, there is no longer a need for electrical charging capacity at the work site since the service vehicle now provides the electrical energy to the work site in parallel with transporting road construction material to and/or from the work site.

According to aspects, the road construction machine is a paver comprising a material hopper arranged to receive road construction material such as asphalt from the service vehicle when in the mated configuration. Thus, the service vehicle docks with the paver and supplies road construction material, while at the same time powering the paver via the electrical connector. The electrical energy from the service vehicle is made available to the road construction machine when in the mated configuration, which is also when the most energy intensive tasks are often performed. This further reduces the need for a high capacity separate ESS on the road construction equipment. For instance, an electrical paver performs paving when docked to the service vehicle, when it also consumes the most energy.

According to aspects, the service vehicle and the road construction machine comprise respective mechanical coupling devices arranged to form a mechanical connection when in the mated configuration. This mechanical connection provides a robust link between the two vehicles. Using this mechanical connection one vehicle may push or pull the other vehicle, which then may be placed in an inactive mode of operation, at least when it comes to motion actuators. This way the road construction process may be simplified since only one vehicle unit provides the propulsion function. Also, the mechanical integrity of the electrical connection between the vehicles may be improved if the two vehicle units are mechanically coupled to each other in this manner.

According to aspects, the service vehicle comprises an electronic control unit (ECU) arranged to assume control of one or more functions on the road construction machine when in the mated configuration. This simplifies control of the road construction process, since one ECU may assume a master role to control other ECUs which are operated in a slave mode of operation. The reverse configuration, where an ECU on the road construction machine instead assumes the role of master and the service vehicle enters a slave mode configuration, is also possible.

There is also disclosed herein road construction machines such as pavers, road milling machines, and electrically powered compactors, as well service vehicles which may be used in the proposed system. There is also provided methods associated with the above-mentioned advantages, and computer programs for controlling the various vehicles and machines comprised in the road construction system.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

Figure 1:
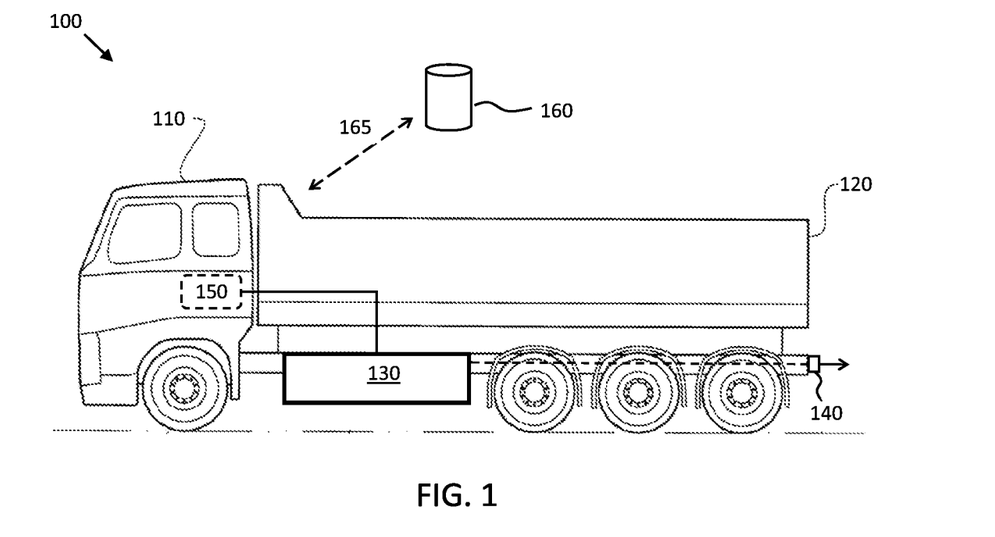
FIG. 1 illustrates an example heavy-duty service vehicle.

It is to be understood that the present invention is not limited to the embodiments described herein and illustrated in the drawings; rather, the skilled person will recognize that many changes and modifications may be made within the scope of the appended claims. FIG. 1 illustrates a heavy-duty vehicle 100 arranged to transport road construction material to and/or from a road construction work site. A road construction material specifically targeted by the present disclosure is asphalt, which is sometimes also referred to as asphalt concrete. However, the techniques disclosed herein may also be applied for processing other road construction materials, such as roller compacted concrete (RCC) and foundation materials like gravel and macadam. A service vehicle arranged to supply road construction materials to a work site is often referred to as a supply vehicle. A service vehicle may also be arranged to remove road construction material from a work site, such as road material produced by a road milling machine, and other excess materials.

A service vehicle like the vehicle 100 is normally equipped with a front part 110 comprising the cabin, and a rear part comprising an open-box bed 120 or cargo hold for carrying the road construction material. Water may also be carried by the service vehicle and supplied to a road compactor.

The rear part 120 is optionally hinged at the rear and equipped with hydraulic rams to tip the rear part, thus allowing the material in the bed to be deposited ("dumped") on the ground behind the truck at the site of delivery. The service vehicle may also comprise a push-off trailer which does not comprise a tipping function. Hauler trucks may only comprise an open-box bed without tipping or pushing function.

The service vehicle 100 comprises an electrical storage system (ESS) 130 arranged to carry electrical energy. This electrical storage system normally comprises a battery and may also be complemented by a fuel cell stack. The ESS may be charged via electrical connection to an external charging station, or by on-board electrical power generators. Such generators may comprise regenerative braking systems and/or on-board combustion engines arranged to generate electrical power.

The service vehicle 100 may be an electrically powered vehicle, or a hybrid electric vehicle. The service vehicle may also be a regular combustion engine-powered vehicle, in which case the ESS is primarily intended for powering auxiliary equipment and external machinery, as will be described in the following.

The vehicle 100 comprises an electrical connector 140 arranged for interfacing with other vehicles and optionally also with a charging station for replenishing the ESS. As will be explained in the following this electrical connector 140 is arranged to interface with road construction machines to connect the electrical system on the road construction machine to the ESS 130 on the service vehicle 100. Thus, the extended ESS capacity of the service vehicle 100 becomes directly available to power consumers on the road construction machine.

The electrical connector 140 may comprise a cable interface, and/or a fixed connector which is arranged to directly mate with a fixed connector on the road construction machine. The electrical connector may also be arranged to interface with a charging facility at a loading bay where, e.g., the service vehicle receives road construction materials for transport away to the road construction site, or at an off-loading site where the service vehicle 100 off-loads road construction materials transported away from a road construction site. The electrical connector will be exemplified and discussed in more detail in connection to FIG. 6 below.

An electronic control unit (ECU) 150 may be comprised to control various functions on the service vehicle 100, such as vehicle motion and actuation of the cargo off-loading function. This ECU may also be connected to a wireless transceiver which allows it to establish a connection 165 to a remote network resource such as a server 160 on the Internet. The wireless connection 165 may also be established directly to another vehicle, such as a paver or some form of control unit at a road construction site.

Figure 2:
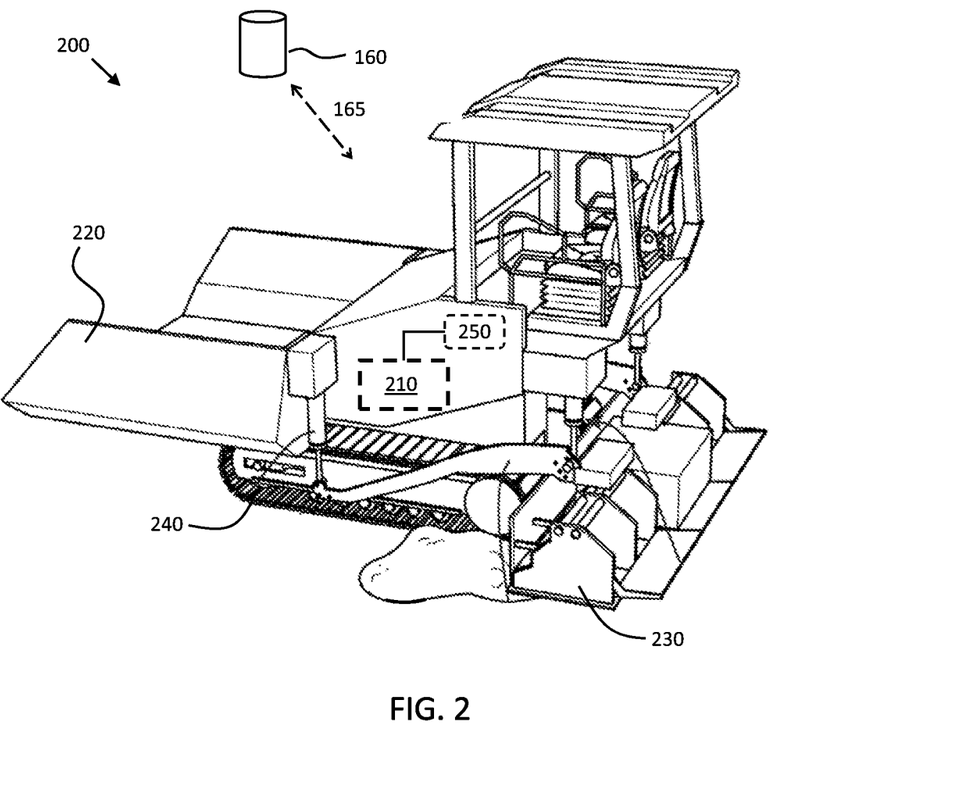
FIG. 2 shows an electric paver according to an example implementation.

FIG. 2 illustrates an example electric paver 200 with an electric system 210 configured to power one or more functions on the paver 200. For instance, the electric system 210 may be arranged to provide power to one or more electric machines arranged to provide propulsion to the paver via the tracks 240. The electric system 210 may also be arranged to power a material hopper 220 and/or an electrically heated screed 230. The paver 200 may be a fully electric paver which lacks combustion engine or a hybrid electric paver which is only partly electrically powered.

Figure 11:
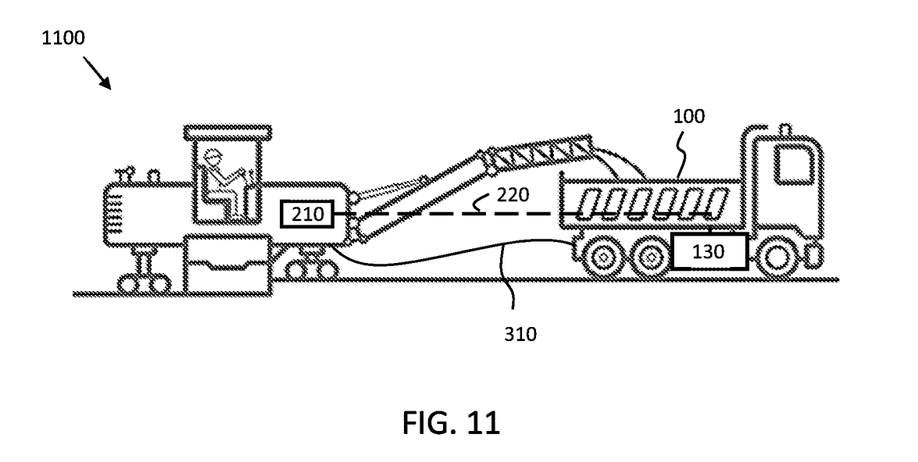
FIG. 11 illustrates a service vehicle docked to a road milling machine.
Figure 12:
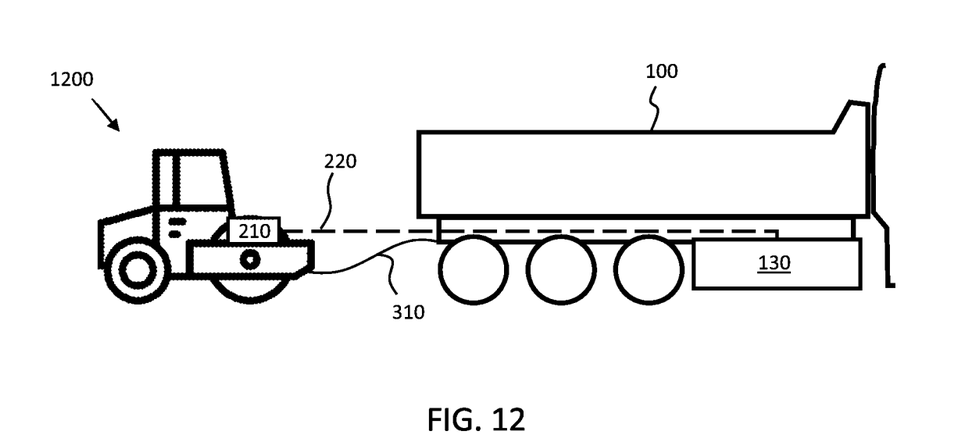
FIG. 12 illustrates a service vehicle docked to a road compactor.

The electric paver 200 is an example of a road construction machine. Other road construction machines comprise road milling machines that remove road material from a road during road refurbishing, and also compactors. An example road milling machine 1100 is illustrated in FIG. 11, while FIG. 12 shows an example compactor 1200. It is appreciated that one or more road construction machines may be docked to a service vehicle at the same time, e.g., a paver followed by one or more compactors, where the paver is connected by fixed connection while the compactors are connected by cable to the service vehicle ESS 130. A road construction machine 200, 700, 1100, 1200 may, as noted above, be fully electric, or hybrid electric, i.e., at least partly electrically powered and at least partly powered by, e.g., a combustion engine.

The paver 200 often operates on construction sites where there is no readily available mains power. Hence, even if sufficient battery capacity is provided on the paver, it would be difficult to operate it since there would be no natural way to charge it when the on-board battery system becomes depleted. A normal paver would require on the order of 500 kWh for one day work, i.e., a substantial amount of energy. Unless a high-power charging facility is available at the road construction site, the paver would need to spend a lot of time each day in charging, and thus suffer in terms of duty cycle.

The present disclosure revolves around a concept where the service vehicle 100 not only transports road construction materials to and from the work site, but also electrical power to operate the road construction machines at the site, such as the paver 200. The paver then only needs a smaller battery to perform less energy intensive tasks as, e.g., positioning itself for starting a road paving operation, and perhaps also preparing paver functions such as electrically heating the screed in preparation for the paving operation. The supply truck 100 then arrives with the road construction materials, and at the same time provides electrical power for the paver to complete at least part of the paving process when mated to the service vehicle, i.e., when the electric system 210 of the paver is connected to the ESS 130 of the service vehicle 100. The service vehicle 100 may either just power the paver when in mated configuration or even provide a fast charge function to replenish the on-board battery systems of the paver 200. In this case the paver 200 receives more electrical energy than it consumes during the road construction task when mated to the service vehicle. The paver 200 comprises a material hopper 220 arranged to receive the road construction material from the service vehicle 100 when in the mated configuration. The one or more electrically powered functions on the paver 200 may comprise any of: paver electrical propulsion, electric screed heating, and a material hopper operation. Electrical energy is, according to this concept, equated with any road construction material required to complete the road construction, it is delivered to the work site by the service vehicle, which at the same time may deliver the more traditional road construction materials such as asphalt for a paver, or water for a compactor.

The paver may also comprise an ECU 250 configured to control one or more functions of the paver 200. The ECU 250 may also be connected to a wireless transceiver which allows it to establish a connection to a remote network resource, such as the server 160 on the Internet. The wireless connection may also be established directly to another vehicle, such as to the service vehicle 100. The wireless transceiver on the paver 200 may be arranged to receive a command directly from the service vehicle 100, or indirectly via the server 160, where the command comprises an instruction to commence electric heating of an electrically heated screed 230 of the paver 200.

To summarize, there is disclosed herein a road construction system comprising a road construction machine such as an electric paver 200 and one or more service vehicles 100 arranged to supply road construction material to the electric paver 200 at a road construction work site. Each service vehicle 100 comprises an ESS 130, and an electrical connector 140 arranged to interface with an electric system 210 of the paver. The paver 200 is arranged to dock with the service vehicle 100 in a mated configuration to receive the road construction material and to at the same time also receive electrical energy via the electrical connector 140 on the service vehicle. This means that the paver 200 is arranged to be at least partly powered from the service vehicle ESS 130 when in the mated configuration. The paver 200 may comprise its own ESS for at least temporarily powering some pf the paver functions, such as propulsion and screed pre-heating. The auxiliary ESS is optionally a modular ESS comprising a configurable number of ESS modules, where each ESS module is associated with an electrical storage capacity. This way the battery capacity of the paver can be adapted to the current road construction site. Some road construction sites may comprise quick-charge stations that reduce the need for battery capacity, while other road construction sites do not. Also, some road construction sites may be fed with road construction material by service vehicles which do not comprise the ESS 130 and electrical connector 140, while other sites are regularly visited by service vehicles able to feed electrical power to the work machines on the site in addition to the road construction materials, as discussed above. The electrical storage capacity of each paver auxiliary ESS module may be between 10 kWh and 40 kWh, and preferably about 25 kWh. Of course, storage capacity requirements will vary depending on application and also on the vehicle involved. Thus, any electrical storage capacity may be used with the herein proposed techniques.

Some pavers are operated in combination with a material transfer vehicle unit. A material transfer vehicle is an intermediary storage for road construction materials. The service vehicle then dumps its load onto the material transfer vehicle, which then services the paver. The techniques disclosed herein are applicable also in case a material transfer vehicle is being used. For instance, the material transfer vehicle may be configured as conduit for the electrical power from the service vehicle to the paver. The material transfer vehicle may also be at least partly powered from the ESS 130 on the service vehicle 100 during the road construction process. The material transfer vehicle may also be used as electrical energy buffer at the work site, where the service vehicles depositing road construction material charges the material transfer vehicle, which then in turn powers one or more of the road construction vehicles as they perform the more energy intensive tasks during the road paving process. Again, the service vehicle 100 regularly delivers electrical energy to the work site, which reduces the requirements on electrical mains connections at the work site, and also reduces the ESS capacity requirements on the road construction machines at the work site.

Figure 3:
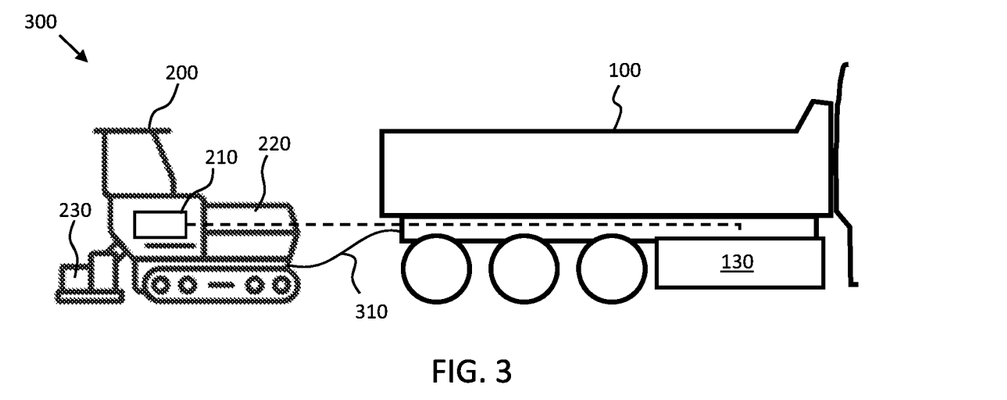
FIG. 3 illustrates an electric connection between service vehicle and paver.
Figure 4:
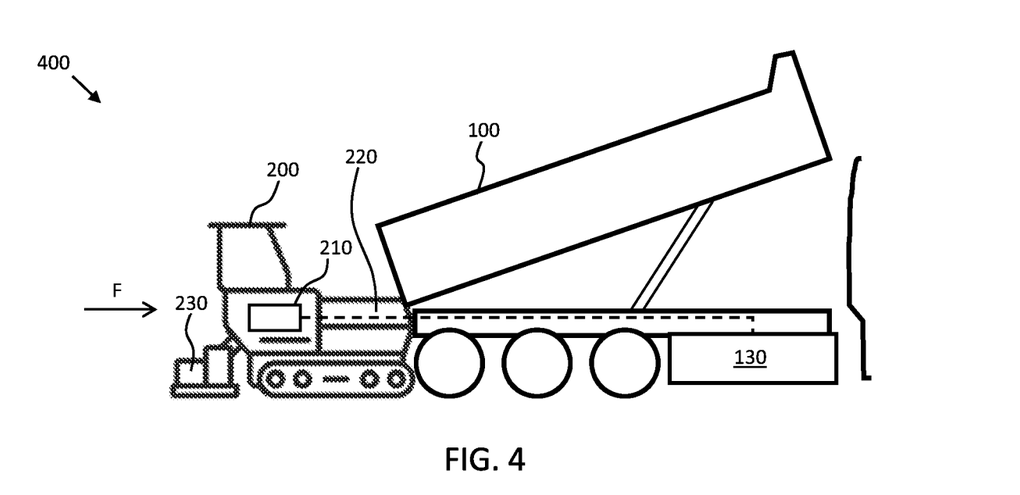
FIG. 4 shows a paving process involving a service vehicle and a paver.
Figure 5:
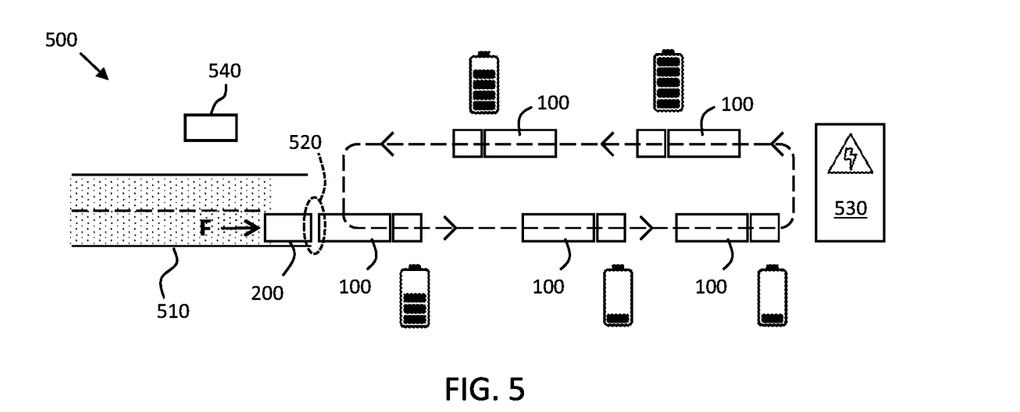
FIG. 5 illustrates a road construction process.

FIGS. 3 and 4 illustrate some example use-cases 300, 400 of the proposed system, and FIG. 5 shows how the supply process 500 of an electric road construction site may work in practice.

In FIG. 3, the service vehicle ESS 130 has been connected to the electric system 210 of the road construction machine via cable 310. The service vehicle 100 then powers one or more functions on the road construction machine via the electric cable. The electric connection between service vehicle 100 and road construction machine is preferably a direct current (DC) connection which essentially connects the ESS 130 to the electric system 210 of the road construction machine, thus emulating a large on-board battery system on the road construction machine.

FIG. 4 illustrates another example use-case when the service vehicle 100 also mechanically engages the road construction machine, i.e., where the service vehicle 100 and the road construction machine comprise respective mechanical coupling devices arranged to form a mechanical connection as well as an electrical connection between the ESS 130 and the electrical system 210 when in the mated configuration. The mechanical coupling may, e.g., be via a trailer coupling of the service vehicle 100 which allows the service vehicle 100 to tow the road construction machine during the road construction task. Alternatively, the coupling may be via push-rollers or the like, which are rotatable support elements that, e.g., a paver can push against the rear wheels of the service vehicle 100, and in this way push the service vehicle 100 in front of it during the asphalt laying process. As for the other case, the ESS 130 of the service vehicle 100 is connected to the electric system 210 of the road construction machine, thereby powering one or more electric functions on the road construction machine. Thus, the service vehicle 100 and the road construction machine may comprise respective mechanical coupling devices arranged to support both a pushing force exerted by the road construction machine on the service vehicle 100, and/or a pulling force exerted by the service vehicle 100 on the road construction machine.

The same principles of the service vehicle 100 transporting road construction material and electrical energy is illustrated in FIG. 11 for a road milling machine 1100. The road milling machine has an electrical system 210 used to power one or more function on the milling machine. When the road milling machine is mated to the service vehicle 100, the ESS 130 of the service vehicle is connected to the electrical system 210 of the road milling machine, allowing the road milling machine to draw power from the ESS 130 and also to charge on-board batteries on the road milling machine. The service vehicle 100 then transports the milled road material away from the work site. It is noted that the road milling machine 1100 is in mated configuration with a service vehicle 100 during the most energy intensive work tasks, i.e., during milling. The road milling machine 110 may of course also dock directly to the service vehicle, forming a mechanical coupling as well as an electrical. The mechanical coupling and the electrical connector 140 may be combined into one single unit.

FIG. 12 shows an example ground compactor 1200 in mated configuration with a service vehicle 100. The service vehicle provides electrical power to the ground compactor via the cable 310. Of course, a direct mechanical coupling between service vehicle and compactor may also be realized, but a cable connection may be preferred in order to not hamper the maneuverability of the ground compactor 1200.

FIG. 5 illustrates an example road construction site 510 being fed with road construction material from a plurality of service vehicles 100 operating in a cyclic manner, which may of course also remove material from the site, such as milled road surface material from one or more road milling machines involved in road refurbishing. Each service vehicle 100 visits a supply station 530 where it receives or off-loads road construction material, and optionally also electrical energy, e.g., via high power quick charge. The service vehicles 100 therefore leave the supply station 530 with electrical energy in addition to the road construction materials. Of course, some electrical energy may also be regenerated on the way to the road construction site. The service vehicles 100 may as mentioned above be electrically powered vehicles, or hybrid electric vehicle which use some of the electrical energy during the transport to the work site. However, it is also possible that the service vehicle 100 are powered by combustion engines, in which case the ESS energy is solely intended for powering the construction equipment at the road construction site.

Once a service vehicle arrives at the work site, it docks with the road construction machine or machines, in the above-mentioned mated configuration 520. This mated configuration may comprise an actual mechanical coupling between service vehicle 100 and road construction machine as shown in FIG. 4, or just an electrical connection via cable as shown in FIG. 3 above. The service vehicle then, e.g., provides the road construction material to a paver 200 or receives milled road material from a road miller, while at the same time providing the electrical energy needed for performing the road construction task. As mentioned above, the provided amount of electrical energy may be smaller than the amount required to perform the road construction task, in which case the state of charge of an auxiliary ESS in the road construction machine will be gradually reduced during a work day. The amount of energy may also be equal to or above the amount required to perform the work task, in which case the state of charge of the road construction machine ESS is expected to increase with each visit from a service vehicle 100. The amount of supplied energy may of course also vary between service vehicles, some service vehicles may be able to provide more energy than others, depending on the service vehicle type and overall state of charge of the respective service vehicle ESS. The service vehicles return to the supply station 530 after having delivered or removed the road construction material to/from the site, and the cycle is completed.

Notably, the flow of energy to the work site 510 from the supply station 530 may be monitored from a monitoring station 540, e.g., via the wireless links 165. The monitoring station 540 may be arranged to monitor auxiliary ESS state at the different road construction vehicles at the work site, and request energy transfer from the supply station 530 via the service vehicles 100 in dependence of this auxiliary ESS state. This way no more energy than required will be transported to the work site. This may be an advantage in case no quick charging capability is available at the supply site, such that service vehicles need to wait until the ESS has reached full state of charge.

Referring also to FIG. 1, the ECU 150 on the service vehicle 100 may assume control of one or more functions on the road construction machine when in the mated configuration, and optionally also before the service vehicle 100 has mated with the road construction machine. In this case the ECU 250 on the road construction machine may operate in slave configuration to the master ECU on the service vehicle 100. The reverse configuration is of course also possible, i.e., the road construction machine ECU 250 may assume a master role and control one or more function of the service vehicle.

The ECU configured as master may control the road paving operation to, e.g., provide a desired amount of propulsion torque on both vehicles to move the combination forward, in direction F marked in FIG. 4 and in FIG. 5, at a desired pace. The master ECU may also, e.g., control the transfer of road construction material from a tipper truck or push-off truck to the material hopper 220.

It is appreciated that a mated configuration of, e.g., a paver and a service vehicle, where a master ECU controls motion of both units, will not need a mechanical coupling between vehicle units, since the propulsion of the vehicle units can be coordinated by the master ECU. This way a virtual "mechanical coupling" between the vehicle units can be established. This virtual coupling does not require physical contact between the vehicle units. The same holds true for any road construction machine, including compactors and road milling machines.

The wireless transceivers on the service vehicle 100 and on the road construction machine may be used with advantage to exchange messages between the two vehicles, such as control commands from a master ECU to a slave ECU, and requests for status information. These messages may be exchanged once the service vehicle is mated with the road construction machine. However, additional advantages may be obtained if some messages are exchanged also before the two vehicles enter into the mated configuration. For instance, the service vehicle may be arranged to transmit a command to the road construction machine, where the command comprises, e.g., an instruction to commence electric heating of an electrically heated screed 230 of a paver 200. This way the service vehicle can trigger a pre-heating of the screed, such that it is ready to start operating as soon as the service vehicle arrives at the road construction site. The service vehicle 100 can calculate its approximate arrival time based on an on-board navigation system, which together with information related to how long the pre-heating takes, can be used to determine a suitable time for transmitting the pre-heating command to the paver 200.

Figure 6:
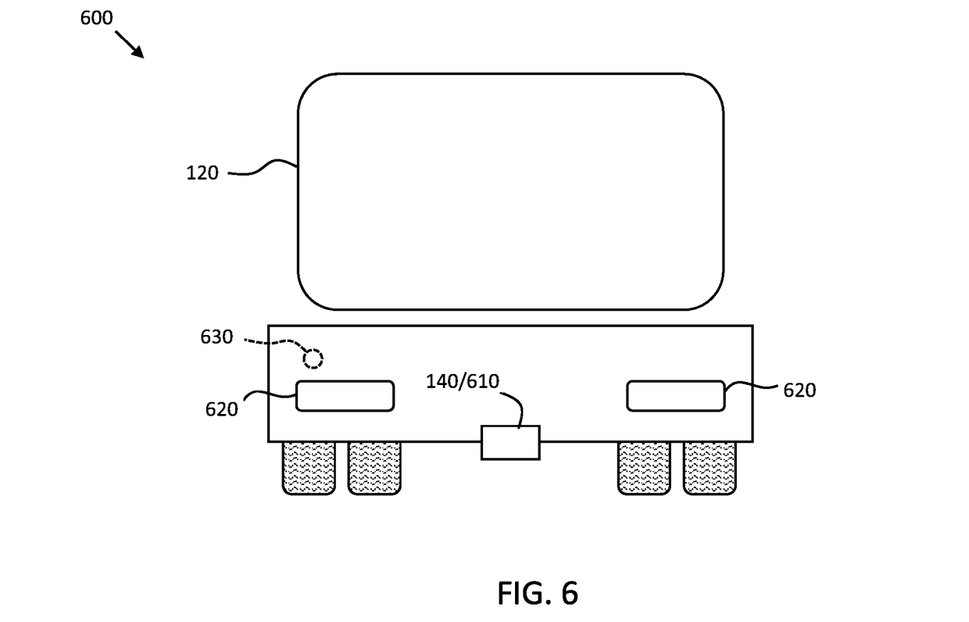
FIG. 6 is a rear view of a service vehicle.
Figure 7:
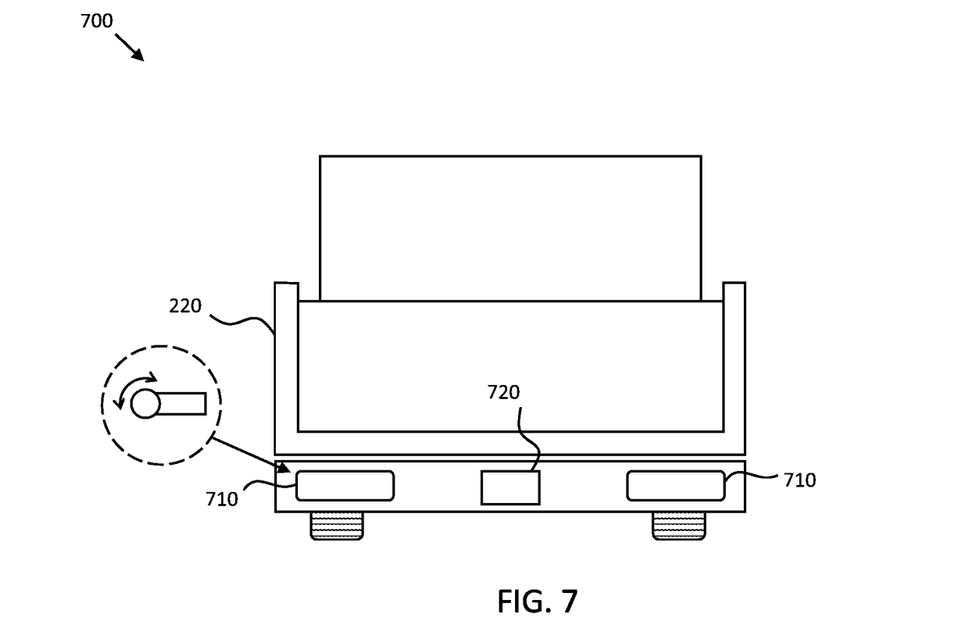
FIG. 7 is a front view of an electrically powered paver.

FIG. 6 shows a rear view of an example service vehicle 600 and FIG. 7 shows a front view of an example paver 700.

The service vehicle 600 in FIG. 6 comprises a coupling device 610 arranged to provide a mechanical coupling between the service vehicle 100 and the paver 200 when in the mated configuration. This coupling device may be realized by a regular trailer coupling, which allows both push and pull forces between service vehicle and paver. The coupling device may also be integrated with the electrical connection 140, thereby allowing transfer of electrical energy when the service vehicle is coupled to the paver. The paver 700 comprises a corresponding coupling device 720. Similar coupling arrangements may also be assembled on the example road milling machine 1100 and on the example road compactor 1200.

The paver 700 may also engage the rear wheels on the service vehicle by push-rollers 710, which are rotatable drums that may be pushed against the rear wheels on the service vehicle 100. These allow the paver to maintain a coupling force with respect to the service vehicle 100 when in the mated configuration.

An inductive electric connection between service vehicle 100 and paver 200 is also possible, although such types of electrical connections are often power limited.

FIG. 11 shows a road milling machine 1100 arranged to dock with a service vehicle 100 in a mated configuration to off-load the road construction material and to receive electrical energy via the electrical connector 310. A road milling machine is a machine which grinds away the top layer of road material from a road in order to refurbish the road by laying a fresh layer of road material onto an existing foundation. The road material which is stripped from the road is loaded onto a truck and hauled away from the road construction site. The various actuators on the milling machine can be powered directly from the ESS 130 on the service vehicle, as discussed above for the example paver.

FIG. 12 illustrates a compactor 1200 arranged to dock with a service vehicle 100 in a mated configuration to off-load the road construction material and to receive electrical energy via the electrical connector 310. In this case the road construction material may be water, which is required during the compacting.

Figure 8:
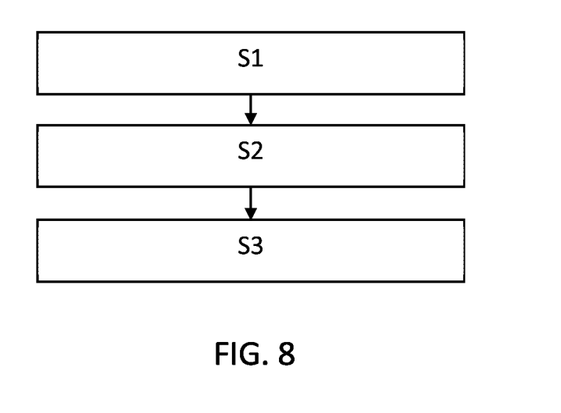
FIG. 8 is a flow chart illustrating a method.

FIG. 8 is a flow chart illustrating a method for constructing a road at a road construction work site 510. The method comprises configuring S1 a road construction machine such as an electric paver 200, 700, a road milling machine 1100 or a road compactor 1200, and one or more service vehicles 100, 600 to supply road construction material to the road construction machine at the road construction work site 510, where each service vehicle 100, 600 comprises an ESS 130, and an electrical connector 140, 310 arranged to interface with an electric system 210 of the road construction machine, docking S2 the road construction machine with the service vehicle 100, 600 in a mated configuration 520 at the work site 510 to transfer road construction material and electrical energy from the service vehicle to the road construction machine, and at least partly powering S3 the road construction machine from the service vehicle ESS 130 when in the mated configuration.

Figure 9:
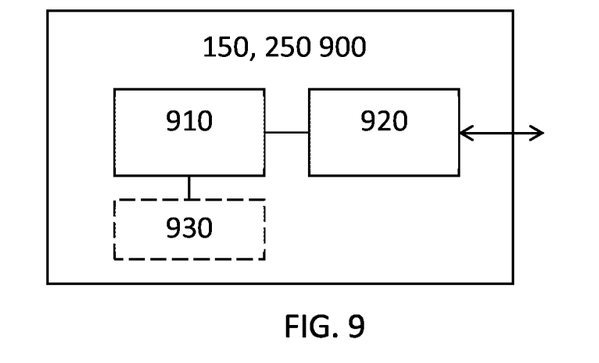
FIG. 9 schematically illustrates an electronic control unit.

FIG. 9 schematically illustrates, in terms of a number of functional units, the components of a control unit 900 according to embodiments of the discussions herein, such as any of the ECUs 150, 250. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 900 to perform a set of operations, or steps, such as the methods discussed in connection to FIG. 8. For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
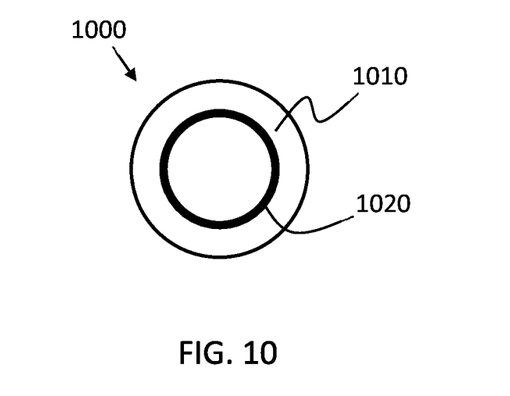
FIG. 10 illustrates a computer program product.

FIG. 10 illustrates a computer readable medium 1010 carrying a computer program comprising program code means 1020 for performing the method illustrated in FIG. 8, when said program product is run on a computer. The computer readable medium and the code means may together form a computer program product 1000.

The invention claimed is:

1. A road construction system comprising:
an at least partly electrically powered road construction machine, and
one or more service vehicles arranged to transport road construction material to and/or from the electric road construction machine at a road construction work site,
wherein each service vehicle of the one or more service vehicles comprises an electrical storage system (ESS) and an electrical connector arranged to interface with an electric system of the road construction machine,
wherein the road construction machine is arranged to dock with at least one service vehicle of the one or more service vehicles in a mated configuration to receive and/or off-load the road construction material and to receive electrical energy via the electrical connector,
wherein the road construction machine is arranged to be at least partly powered by the ESS of the at least one service vehicle when in the mated configuration, and
wherein the road construction machine and the at least one service vehicle each comprise a mechanical coupling device configured to form a mechanical connection when in the mated configuration, wherein the mechanical connection transfers motive force between the road construction machine and the at least one service vehicle when in the mated configuration.

2. The road construction system of claim 1, wherein the road construction machine comprises one or more of a paver, a road milling machine, and a compactor.

3. The road construction system of claim 1, wherein the road construction machine is a paver comprising a material hopper arranged to receive the road construction material from the at least one service vehicle when in the mated configuration.

4. The road construction system of claim 1, wherein the mechanical connection is configured to support a pushing force exerted by the road construction machine on the at least one service vehicle.

5. The road construction system of claim 1, wherein the mechanical connection is configured to support a pulling force exerted by the at least one service vehicle on the road construction machine.

6. The road construction system of claim 1, wherein the at least one service vehicle comprises an electronic control unit (ECU) configured to control one or more functions of the road construction machine when in the mated configuration.

7. The road construction system of claim 1, wherein the road construction machine comprises an ECU configured to control one or more functions on the at least one service vehicle when in the mated configuration.

8. A service vehicle arranged to supply road construction material to a road construction work site comprising:
a road construction machine,
wherein the service vehicle comprises an electrical storage system (ESS) and an electrical connector arranged to interface with an electric system of the road construction machine in a mated configuration,
wherein the ESS is arranged to at least partly power the road construction machine when in the mated configuration, and
wherein the service vehicle and the road construction machine each comprise a mechanical coupling device configured to form a mechanical connection when in the mated configuration, wherein the mechanical connection transfers motive force between the road construction machine and the service vehicle in the mated configuration.

9. The service vehicle of claim 8, further comprising an electronic control unit (ECU) configured to control one or more functions of the road construction machine when in the mated configuration.

10. The service vehicle of claim 8:
wherein the road construction machine is a paver,
wherein the service vehicle comprises a wireless transceiver arranged to transmit a command to the paver, and
wherein the command comprises an instruction to commence electric heating of an electrically heated screed of the paver.

11. The service vehicle of claim 8, further comprising a coupling device arranged to provide a mechanical coupling between the service vehicle and the road construction machine when in the mated configuration.

12. A road construction machine arranged for road construction at a road construction site comprising:
an electric system for powering the road construction machine,
wherein the road construction machine is arranged to interface with an electrical connector of a service vehicle in a mated configuration,
wherein the road construction machine is arranged to be at least partly powered by a service vehicle electric storage system (ESS) when in the mated configuration, and
wherein the service vehicle and the road construction machine each comprise a mechanical coupling device configured to form a mechanical connection when in the mated configuration, and
wherein the mechanical connection transfers motive force between the road construction machine and the service vehicle in the mated configuration.

13. The road construction machine of claim 12, wherein the electric system comprises an auxiliary ESS arranged to temporarily power one or more functions of the road construction machine.

14. The road construction machine of claim 13:
wherein the auxiliary ESS is a modular ESS comprising a configurable number of ESS modules, and
wherein each ESS module is associated with an electrical storage capacity.

15. The road construction machine of claim 14, wherein the electrical storage capacity of each ESS module is between 10 kWh and 40 kWh.

16. The road construction machine of claim 15, wherein the electrical storage capacity of each ESS module is about 25 kWh.

17. The road construction machine of claim 13, wherein the one or more functions of the road construction machine comprises one or more of: road construction machine electrical propulsion, electric screed heating, and a material hopper operation.

18. The road construction machine of claim 12:
    wherein the road construction machine is a paver comprising a wireless transceiver arranged to receive a command from the service vehicle, and
    wherein the command comprises an instruction to commence electric heating of an electrically heated screed of the paver.

19. The road construction machine of claim 12, further comprising a coupling device arranged to provide a mechanical coupling between the service vehicle and the road construction machine when in the mated configuration.

20. A method for constructing a road at a road construction work site comprising:
    configuring an electric road construction machine and one or more service vehicles to supply road construction material to the electric road construction machine at the road construction work site,
    wherein each service vehicle of the one or more service vehicles comprises an electrical storage system (ESS) and an electrical connector arranged to interface with an electric system of the road construction machine,
    docking the road construction machine with at least one service vehicle of the one or more service vehicles in a mated configuration at the road construction work site to transfer road construction material and electrical energy from the service vehicle to the road construction machine,
    at least partly powering the road construction machine by the ESS of the at least one service vehicle when in the mated configuration, and
    wherein the road construction machine and the at least one service vehicle each comprise a mechanical coupling device configured to form a mechanical connection when in the mated configuration, wherein the mechanical connection transfers motive force between the road construction machine and the at least one service vehicle in the mated configuration.

\* \* \* \* \*